Patented July 22, 1947

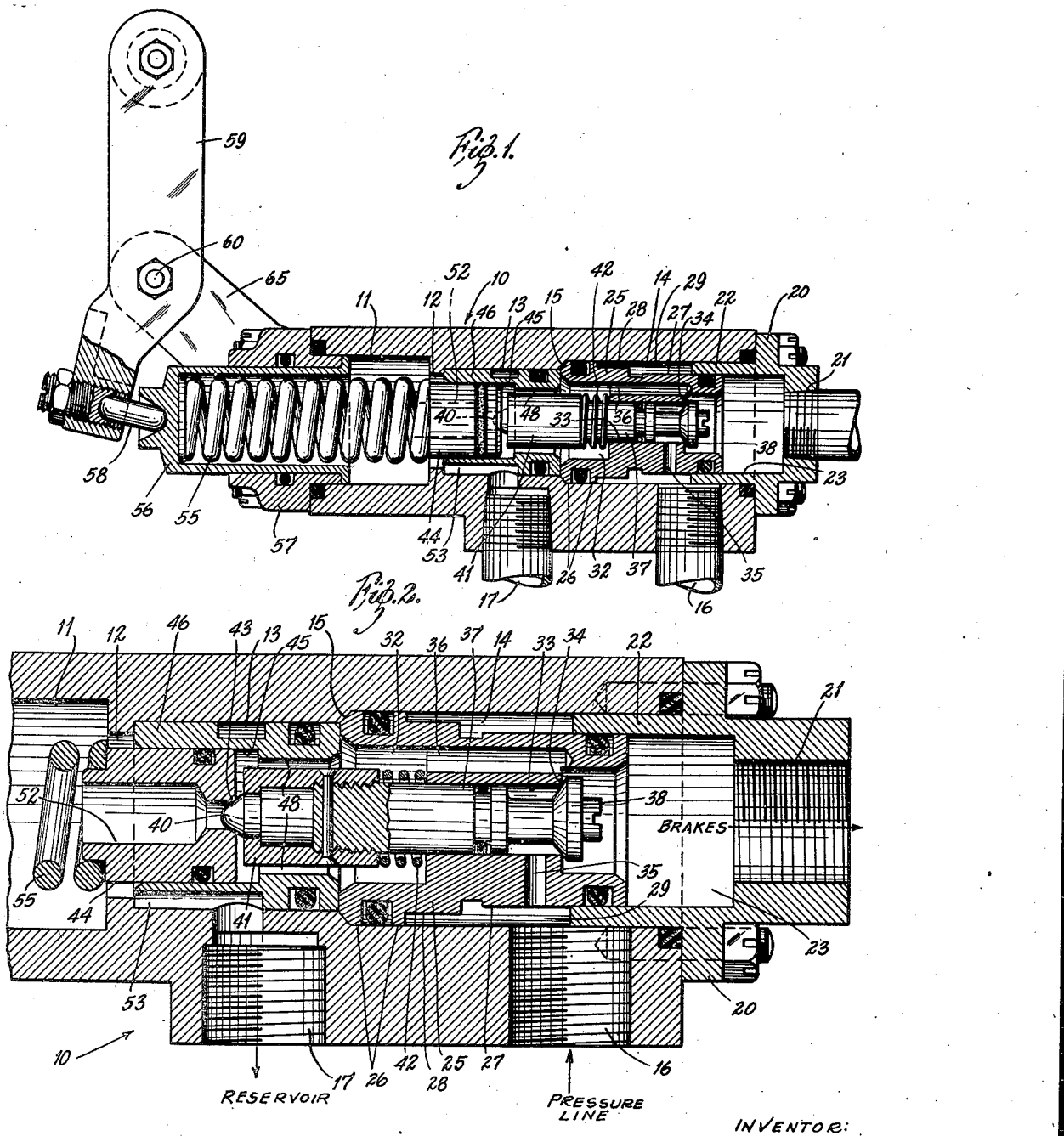

2,424,331

UNITED STATES PATENT OFFICE 2,424,331

BRAKE VALVE

Howard E. Rose, Normandy, Mo., assignor to Alco Valve Company, University City, Mo., a corporation of Missouri Application September 20, 1943, Serial No. 503,055

13 Claims. (Cl. 303—54)

In general, this invention relates to hydraulic valves. More particularly, the invention relates to such a valve to be used in the braking system of airplanes, and the like.

A general object of the invention is to provide a valve, adjustable as to pressure range and therefore adaptable to use in airplane braking systems in which there are a number of pressure ranges.

A further object is to provide a braking valve in which the amount of pedal pressure is in direct proportion to the braking action so that the operator has a "feel" of the braking pressure he is exerting.

A further object is to provide a valve which will warn the operator when the source of hydraulic pressure at the brake has failed.

In the drawings:

Fig. 1 is a longitudinal section of the valve and associated parts;

Fig. 2 is an enlarged section of parts of Fig. 1, showing in greater detail the valve structure.

The valve includes a housing 10 having an axial opening therethrough divided into several sections. A first section 11 (left to right in the drawing) is a spring receiving chamber. The chamber 11 communicates through a narrowed passage 12 with a chamber 13; and the chamber 13, in turn, opens into a larger chamber 14, there being a shoulder 15 between them.

A pressure inlet port 16 opens into the chamber 14 and is adapted to be connected to a source of fluid under pressure, here described as oil. A reservoir port 17 opens from the chamber 13, and is adapted to be connected to an oil reservoir.

The open end of the chamber 14 is closed by a cap 20, that has an axial opening 21 adapted to be connected to the brake operating mechanism, or whatever is to be controlled by the fluid under pressure. The cap has a flange 22 entering the chamber 14, and provided with an inner bearing surface 23. Suitable screws and packing, as shown, may be employed in sealing the cap 20 to the valve housing 10.

A sliding sleeve 25 has an outer surface 26 at one end (left, in the drawings) slidably engaged with the walls of the chamber 14, and a smaller outer surface 27 slidable within the bearing surface 23 of the cap 20. The sliding sleeve 25 has an intermediate outside surface 28 that provides an abutment that may engage the end of the flange 22 to limit movement of the sleeve to the right. Movement thereof to the left is limited by the shoulder 15.

It will be seen that the space between the walls of the chamber 14 and the smaller parts of the sleeve 25 provides a space 29 open to the inlet port 16, for a purpose to be described.

The sleeve 25 has an axial port therethrough, including a larger port 32 into which a smaller port 33 opens. The smaller port 33 terminates in a valve seat 34, and also has a port 35 leading therefrom into the space 29 opening into the inlet port 16. A port 36 connects the port 32 with the outer end of the valve seat.

A poppet valve 37 slides in the port 33, and has a head 38 engageable with the seat 34. The valve is cut away back of the head 38 to permit oil to flow from the port 35 into the cap 20 and to the brake mechanism. It will be seen that pressure against the poppet valve is balanced within the port 33. It will be understood that, while a poppet valve is most desirable here, other types of valve may be used. Hence the terms valve member and valve seat member, or valve closure member, are intended to mean cooperating valve elements relatively movable to control flow.

The valve 37 at its left end has a relief poppet 40 united thereto. As will be seen, a sleeve 41 is fitted over the relief poppet 40 and threaded on to the body of the valve 37, and a retaining pin is then put through the sleeve 41 and the main body of the valve. The relief poppet 40 is thus held in proper alignment and may be replaced readily.

The relief poppet 40 is adapted to engage with a valve seat 43 on a sliding pressure head 44, sliding in an opening 45 in a sliding sleeve 46 that bears in the chamber 13 of the main valve body 10. It will be seen that the sleeve 46 normally just fills the axial length of the chamber 13, engaging at one end against the constriction 12 and at the other end against the sliding sleeve 25. The sleeve 46 has a smaller opening 48, opening into the passage 45. The opening 48 provides a shoulder that limits movement to the right of the pressure head 44, relative to the sliding sleeve 46. The opening 48 is likewise bigger than the outer diameter of the cap 41 on the valve 37, so that fluid may flow past the cap 41.

It will be seen further that the passage 48 opens into the enlarged inner space 32 of the sliding sleeve 25 which, in turn, is connected by the port 36 with the brake mechanism side of the valve. The valve 37 has a light spring 42 that urges the valve head 38 normally against the seat 34.

The valve seat 43 in the pressure head 44 opens into the space 45, and into a passage 52 through the pressure head, opening into the chamber 11. The pressure head is cut away at 53 so that the chamber 11 is always in communication with the reservoir opening 17.

The pressure head 44 is normally held in its right hand position by a spring 55 that is relieved when the parts are in the positions shown in the drawings. The spring 55 engages between the pressure head 44 and a cap 56 that is slidably mounted within a fixed cap 57, held by screws or the like to the main body 10 of the valve mechanism. The cap 56 is flanged to limit its outward movement. It likewise is engaged by a universal joint connection 58 on a brake operating lever 59, pivoted at 60 on an arm or arms 65 attached to the main valve housing 10. The lever 59 is adapted to be operated by any suitable mechanism, such as a foot pedal accessible to the operator.

*Operation*

With the valve in the position of Figs. 1 and 2, the port 16 will be connected to the pressure line providing oil under pressure. The return line 17 will be connected to a reservoir at lower pressure and the line 21 will be connected to the brake operating mechanism.

With the valve in its rest position, oil under pressure enters the space 29 on the outside of the sliding sleeve 25 and it passes through the port 35 to the back side of the valve head 38, where it is ineffective to shift the valve owing to the balanced design thereof. It acts against the radial edges of the sleeve 25 to urge that sleeve to the left, and to hold the other sleeve 46 to the left.

When the operator compresses the spring 55 by movement of the lever 59 a certain distance, this applies pressure against the pressure head 44. As the pressure head 44 is in contact with the poppet valve 40, this pressure will also displace the valve 37 and lift the head 38 from the seat 34 a distance determined by the amount of displacement of the lever 59. Thereupon, the oil under pressure in the line may flow around the valve head 38 and pass to the brakes, sufficiently to build up a pressure in the brakes, as will be described.

As soon as the valve head 38 opens, oil under pressure flows not only to the brakes but also through the port 36, the passage 32, the passage 48, to the opening 45, where it acts against the pressure face of the pressure head 44, producing a force against this pressure head in opposition to the force of the spring 55. It will be clear that when this back pressure builds up to exceed the force of the spring 55, the pressure head will be moved to the left against the spring 55. It will be seen further that the amount of oil pressure necessary to displace the pressure head 44 against the spring 55 will be determined by the amount of compression of the spring 55 which, in turn, is a function of the amount of displacement of the operating lever 59. Hence, if the operating lever has been moved a relatively short distance the compression of the spring 55 will produce only a relatively small force compared to that exerted by it upon full displacement of the lever 59. With such small force, a smaller back pressure will be required to offset the spring force.

When the back pressure builds up to a value greater than that of the spring 55, it forces the pressure head 44 to the left, and the latter tends to withdraw the valve seat 43 from the return poppet 40, thereby permitting the valve 37 to move to the left to cut off the admission of oil under oil pressure to the brakes, and retaining the oil thus trapped in the brakes at the value predetermined by the amount of compression of the spring 55. This, of course, obtains a predetermined braking effect.

If this braking effect is inadequate, the operator may further compress the spring 55, which will again displace the valve 37, and cause the pressure in the brake mechanism to build up to a new and higher degree until it produces a back pressure against the pressure head 44 sufficient to overcome the new higher force of the spring 55 and effect reclosure of the valve 37.

When the operator releases the spring 55 he will normally do so when the valve is seated both on the seats 34 and 43 after a position of equilibrium has been reached with a certain pressure on the brake mechanism. In this position of equilibrium, the balance is obtained by the exertion of a particular force of the spring 55. Any change in this force will produce a change in the position of the pressure head 44. Consequently, if the spring 55 is released, the result will be that the back pressure of the oil will displace the pressure head 44 to the left, and permit the oil from the brake mechanism to escape around the relief poppet 40 through the passage 52 in the port 53 to the reservoir opening 17. This pressure will relieve all of the pressure in the brake system after the spring 55 is completely relieved, after which the relief poppet valve will reclose. If the spring 55 is only partly relieved, it will cause reduction in the brake pressure until the brake pressure acting upon the face of the pressure head 44 produces a force equal to that of the spring 55, so that the pressure head 44 again seats the relief poppet and thereafter retains the desired pressure in the brake system.

If, for any reason, the brake pressure should go up in excess of that predetermined by the spring 55, it would be immediately relieved because it would produce a back pressure acting against the pressure head 44 in excess of the applied force of the spring 55.

It will be seen that the area of the back pressure face of this pressure head 44 is a critical factor in determining the pressure at which the brakes will be operated for particular positions of the operating lever 59. However, different brake systems employ different applied pressure values so that the positions of equilibrium for a valve would not be the same if it be employed in such different brake systems. The spring 55 may be changed but this is undesirable. In the present valve, changes may readily be made by employing different ones of a series of pressure heads 44 and sleeves 46 in which the area of the pressure faces of the several pressure heads differs. Thus, if the pressure head be made larger, with a corresponding increase in the internal diameter of the chamber 45 of the sleeve 46, a smaller back pressure will produce the same reaction against the spring 55 as is produced by the illustrated pressure head.

A further important advantage of the present valve is that it gives a feel to the operator of the amount of brake pressure he obtains for each position of the brake operating lever. The foregoing has demonstrated that particular brake pressures are obtained for particular amounts of compression of the spring 55. Of course, the amount of compression of the spring 55 is determined by the amount of distance the operating lever is displaced and the resistance to displacement increases with the amount thereon.

If the pressure line or the brake line is damaged or leaking so that no pressure is obtained, the operator will immediately sense that fact with the present valve. The operation of the mechanism is determined by changing the relative positions of the valve 37 with respect to the sleeve 25 and the sleeve 46. In the previous discussion it has been assumed that these two sleeves remain in their illustrated positions and that only the valve 37 moves. It will be seen further that the sleeve 25 is initially maintained to the left by the existence of line pressure within the space 29, since this pressure acts against the shoulders between the larger diameter 26 and the intermediate diameter 28, and also on the shoulder between intermediate diameter 28 and the smaller diameter 27. The opposing force is exerted by the end of the flange 22 and is fixed.

If line pressure fails, then, upon the application of a braking force to the lever 59 and its transmission through the spring 55 to the pressure head 44, there will be no back pressure resisting free displacement of the latter element. Also there will be no pressure in the space 29. Consequently, the pressure head, under the force of the spring 55 being displaced, will move to the right, into engagement with the sleeve 46, and may then move both sleeves 46 and 25 to the right, against such slight resistance that the operator will instantly know that he has no braking power.

If the brake line is broken, then upon opening of the valve 38, the pressure in the space 29 is likewise relieved, and a similar free displacement of the sleeves 46 and 25 will result.

In this description, reference has particularly been made to oil operated brakes. It is clear that the invention is not limited either to oil or to brakes, but may be used wherever a fluid-operated mechanism is to be controlled, wherein it is desirable to obtain a pressure proportional to pressure applied to an operating device, or proportional to the amount of movement thereof.

What is claimed is:

1. In a mechanism of the kind described, a housing, a high pressure inlet adapted to receive fluid under pressure, a working outlet, and a valve mechanism between said inlet and outlet, said valve mechanism including a valve and a seat portion movable relatively to each other, and both movable in the housing, means on the valve seat portion providing a fluid pressure-receiving surface, exposed to pressure in the pressure inlet, whereby said valve seat mechanism is held against movement in the housing, and means to displace the valve from the seat when the latter is held against movement by fluid pressure, acting on said surface.

2. In a mechanism of the kind described, a housing having an inlet to receive fluid under pressure, an outlet, valve means between said inlet and outlet, said valve means including sleeve means slidable in the housing having surfaces exposed to fluid pressure in the inlet, means limiting movement of the sleeve means under such pressure, a valve in the sleeve means and movable therein, said valve being adapted to control fluid flow from the inlet to the outlet, valve spring means yieldably urging the valve toward the sleeve to seat thereon, operating means to displace the valve from the seat against the spring, the force of the valve spring being less than the force of normal fluid pressure against the sleeves, whereby upon non-existence of normal fluid pressure the sleeve means will yield upon operation of the operating means.

3. In a mechanism of the kind described, a housing having an inlet to receive fluid under pressure, an outlet, and valve means therebetween, said valve means including sleeve means slidable in the housing having surfaces exposed to fluid pressure in the inlet, means limiting movement of the sleeve means under such pressure, a valve in the sleeve means and movable therein, said valve being adapted to control fluid flow from the inlet to the outlet, valve spring means yieldably urging the valve toward the sleeve to seat thereon, operating means to displace the valve from the seat against the spring, said operating means comprising a power spring compressor, a power spring, a pressure head to receive the force of the power spring, connections between the head and the valve, the pressure head, opposite the power spring, being exposed to fluid pressure in the outlet, whereby the movement of the head and valve is produced by the resultant of spring force and fluid pressure.

4. In a mechanism of the kind described, a housing having an inlet to receive fluid under pressure, an outlet, and valve means therebetween, said valve means including sleeve means slidable in the housing having surfaces exposed to fluid pressure in the inlet, means limiting movement of the sleeve means under such pressure, a valve in the sleeve means and movable therein, said valve being adapted to control fluid flow from the inlet to the outlet, valve spring means yieldably urging the valve toward the sleeve to seat thereon, operating means to displace the valve from the seat against the spring, said operating means comprising a power spring compressor, a power spring, a pressure head to receive the force of the power spring, connections between the head and the valve, the pressure head, opposite the power spring, being exposed to fluid pressure in the outlet, whereby the movement of the head and valve is produced by the resultant of spring force and fluid pressure, the sleeve means including a separable portion forming a cylinder for the head, whereby changes of head and the separable portion may be made.

5. A valve mechanism including a housing having an inlet to receive fluid under pressure, an outlet, and a relief port, a first sleeve slidable in the housing, having surfaces exposed to fluid inlet pressure, means limiting movement of the sleeve by said pressure, a valve movable axially in said first sleeve, a spring urging the valve and sleeve toward closed position, a port through the sleeve from the inlet to one side of the valve, a second sleeve slidable in the housing, a pressure head slidable in the second sleeve, a relief passage through the head, said head being engageable with the valve to close said relief passage and to shift the valve, the relief passage being connected to the relief port, the second sleeve having a shoulder limiting movement of the head in the sleeve, the valve end of the pressure head being exposed to the outlet fluid pressure, compression means acting on the other end of the pressure head, means to compress the compression means to apply force to the head and to the valve to open the same, the valve being reclosed when the outlet pressure force balances the compression force, and the relief passage being opened when the outlet pressure substantially exceeds the spring pressure.

6. In a valve mechanism of the class described, a housing having an inlet and an outlet for interposition into a fluid pressure transmitting conduit, a member mounted for movement in the housing and having a passage therethrough with which is associated a valve seat, a movable valve element for cooperating with the seat, means providing a stop for limiting the movement of the member in a direction away from the valve element, fluid pressure-responsive means for subjecting the member to fluid pressure in the housing so as to maintain it held engaged with the stop and permitting the valve element to be unseated when there is a fluid under pressure in the housing, means for moving the valve element, and means for causing the valve member to move with the valve element in a direction away from the stop when the fluid pressure in the housing no longer exists.

7. In a valve mechanism of the class described, a housing having an inlet and an outlet, for interposition into a fluid pressure transmitting conduit, a member mounted for movement in the housing and having a passage therethrough with which is associated a valve seat, a movable valve element for cooperation with the valve seat, means providing a stop for limiting the movement of the member in a direction away from the valve element, fluid pressure-responsive means for subjecting the member to fluid pressure in the housing so as to maintain it held engaged with the stop and permitting the valve element to be unseated when there is fluid pressure in the housing, an actuating member, a connection between the actuating member and valve element comprising a coiled spring, and means for causing the valve element, the valve member and the spring to be moved bodily together when the fluid pressure in the housing no longer exists.

8. In a braking system, a housing having an inlet and an outlet for connection into a fluid pressure system, slidable sleeve means mounted in said housing, means to hold the sleeve means to limit sliding thereof in one direction, and fluid pressure receiving surfaces on the sleeve means disposed to receive fluid pressure in the system to hold the sleeve against sliding in the other direction only when said fluid pressure has a predetermined value, a hydraulic valve mounted in said sleeve means, and means for opening said valve by displacing the same relative to the sleeve means when the sleeve means is held against movement.

9. In a braking system, a housing having an inlet and an outlet for connection into a fluid pressure system, slidable sleeve means mounted in said housing, means to hold the sleeve means to limit sliding thereof in one direction, and fluid pressure receiving surfaces on the sleeve means disposed to receive fluid pressure in the system to hold the sleeve against sliding in the other direction only when said fluid pressure has a predetermined value, a hydraulic valve mounted in said sleeve means and adapted to be moved relative to the sleeve means to be opened, a means operating said valve comprising a spring compressor, a spring, and an operable connection between said spring and said valve, whereby compression of the spring opens the said valve, by displacing it relative to the sleeves, the latter being held against movement by hydraulic pressure.

10. In a mechanism of the kind described, a housing having a high pressure inlet adapted to receive fluid under pressure and a working outlet into which said fluid under pressure may be valved, bodily displaceable valve mechanism, including a valve member and a valve closure member between the inlet and the outlet, said members being conjointly movable in the housing, and also relatively movable to open communication between the inlet and the outlet, means to apply force to one of the valve members to move it, means to transmit said force to the other member to cause said valve members to move bodily together, and fluid pressure-responsive means disposed to receive the fluid under pressure in the housing and hold said other member against movement by the force means only when such fluid pressure exists, whereby said force may effect relative movement of the members to open the valve mechanism.

11. In a valve mechanism, a housing having an inlet and an outlet for interposition into a line for transmitting fluid under pressure, a valve member and a cooperating valve closure member between the inlet and the outlet, both members being mounted for movement in the housing, and being relatively movable to effect communication and discommunication between the inlet and the outlet, means applying force to one member to move it, means for causing the other member to follow the movement of the said one, and fluid pressure-responsive means in the housing to receive fluid pressure therein, said fluid pressure-responsive means being operatively associated with the said other member to transmit the pressure of said fluid thereto in opposition to the means causing it to follow the said one member, whereby the members are relatively moved only when said fluid pressure exists.

12. In a valve mechanism, a housing having an inlet and an outlet for interposition into a line for transmitting fluid under pressure, a valve member and a cooperating valve closure member between the inlet and the outlet, both members being mounted for movement in the housing and being relatively movable to effect communication and discommunication between the inlet and the outlet, means applying force to one member to move it, means for causing the other member to follow the movement of the said one, fluid pressure-responsive means in the housing to receive fluid pressure therein, said fluid pressure-responsive means being operatively associated with the said other member to transmit the pressure of said fluid thereto in opposition to the means causing it to follow the said one member, whereby the members are relatively moved only when said fluid pressure exists, said force applying means including a yieldable force means and a displaceable fluid pressure-responsive device interposed between the force means and the member it moves, said housing having connections to transmit fluid pressure from the outlet to said pressure-responsive device to displace it in opposition to the force of the yieldable means, additional valve means operated by such displacement of the pressure-responsive device against said yieldable means, and an additional outlet from the housing connected from said additional valve means.

13. In a valve mechanism, a housing having an inlet and an outlet for interconnection into a fluid pressure line, and a reservoir outlet, an opening in the housing and a closure therefor, a removable sleeve insertable into the opening in the housing, means to hold the sleeve normally immovable in the housing, a pressure head slidable in the sleeve, one side of the pressure head being exposed to main outlet pressure that urges the head in one direction as a function of the area of the head, yieldable force applying means for applying force oppositely on the pressure head, a main valve closure in the housing, a main valve in the housing movable relatively to the closure to control flow between the inlet and the main outlet, the main valve being normally maintained against the pressure head to be moved thereby, to open the main valve when the pressure head is moved by the yieldable force means, but being separable therefrom by withdrawal of the pressure head under action of outlet pressure, and additional valve means operated by separation of the main valve and pressure head, to establish communication between the main outlet and reservoir outlet when main outlet pressure, acting on the pressure head, produces a force greater than the opposite force of the yieldable force means.

HOWARD E. ROSE.

REFERENCES CITED

The following references are of record in the file of this patent:

UNITED STATES PATENTS

| Number | Name | Date |
| --- | --- | --- |
| 1,812,269 | McCauley | June 30, 1931 |
| 1,855,348 | Hamilton | Apr. 26, 1932 |
| 1,874,297 | Ives | Aug. 30, 1932 |
| 2,317,846 | Campbell | Apr. 27, 1943 |
| 2,324,690 | Gardiner | July 20, 1943 |
| 1,791,901 | McIntire | Feb. 10, 1931 |
| 1,927,700 | Dickinson | Sept. 19, 1933 |
| 2,243,781 | Thornhill | May 27, 1941 |